United States Patent
Mabboux

(10) Patent No.: US 8,251,296 B2
(45) Date of Patent: Aug. 28, 2012

(54) FLUID REGULATION THERMOSTATIC VALVE, COOLANT CIRCUIT INCLUDING SUCH VALVE AND METHOD FOR MAKING SUCH VALVE

(75) Inventor: Lionel James Mabboux, Saint Genevieve des Bois (FR)

(73) Assignee: Vernet, Ollainville (FR)

(*) Notice: Subject to any disclaimer, the term of this patent is extended or adjusted under 35 U.S.C. 154(b) by 624 days.

(21) Appl. No.: 12/448,087

(22) PCT Filed: Dec. 21, 2007

(86) PCT No.: PCT/FR2007/002158
§ 371 (c)(1),
(2), (4) Date: Jun. 8, 2009

(87) PCT Pub. No.: WO2008/093027
PCT Pub. Date: Aug. 7, 2008

(65) Prior Publication Data
US 2010/0032490 A1    Feb. 11, 2010

(30) Foreign Application Priority Data
Dec. 22, 2006    (FR) ..................................... 06 11316

(51) Int. Cl.
*F01P 7/00*    (2006.01)
*G05D 23/275*    (2006.01)

(52) U.S. Cl. .................. 236/34.5; 236/93 A; 236/99 J; 236/100

(58) Field of Classification Search ................. 236/34.5, 236/93 R, 93 A, 99 J, 99 K, 100
See application file for complete search history.

(56) References Cited

U.S. PATENT DOCUMENTS

| 5,791,557 A * | 8/1998 | Kunze ........................... 236/34.5 |
| 7,299,994 B2 * | 11/2007 | Brown et al. ................ 236/34.5 |
| 7,819,332 B2 * | 10/2010 | Martin et al. ................ 236/34.5 |
| 2002/0005179 A1 | 1/2002 | Frunzetti et al. | |
| 2006/0006247 A1 | 1/2006 | Roman | |

FOREIGN PATENT DOCUMENTS

| EP | 1 560 097 A | 8/2005 |
| FR | 2807818 | 10/2001 |
| WO | WO 01/95046 A | 12/2001 |

* cited by examiner

*Primary Examiner* — Marc Norman
(74) *Attorney, Agent, or Firm* — Dowell & Dowell, PC

(57) ABSTRACT

The invention relates to a valve (3) that comprises a housing (20) and a thermostatic member (52) having a mobile piston (58) that carries a plug (76) for controlling the fluid flow between two accesses to the housing. In order to simplify the manufacture and the maintenance of the valve, inter alia, a hollow body (54) bearing the thermostatic member is adapted both to be rigidly connected to the fixed portion of the thermostatic member so that the piston can extend inside the inner chamber (64) of the body and so that the plug controls the fluid flow through said chamber, and to be received and sealingly blocked in an inner volume ($V_{20}$) of the housing so that the fluid cannot flow between the two accesses through the chamber, while a thermostatic assembly (50), defined by the bearing body and the thermostatic member connected together, can be urged as a whole into the inner volume of the housing.

12 Claims, 3 Drawing Sheets

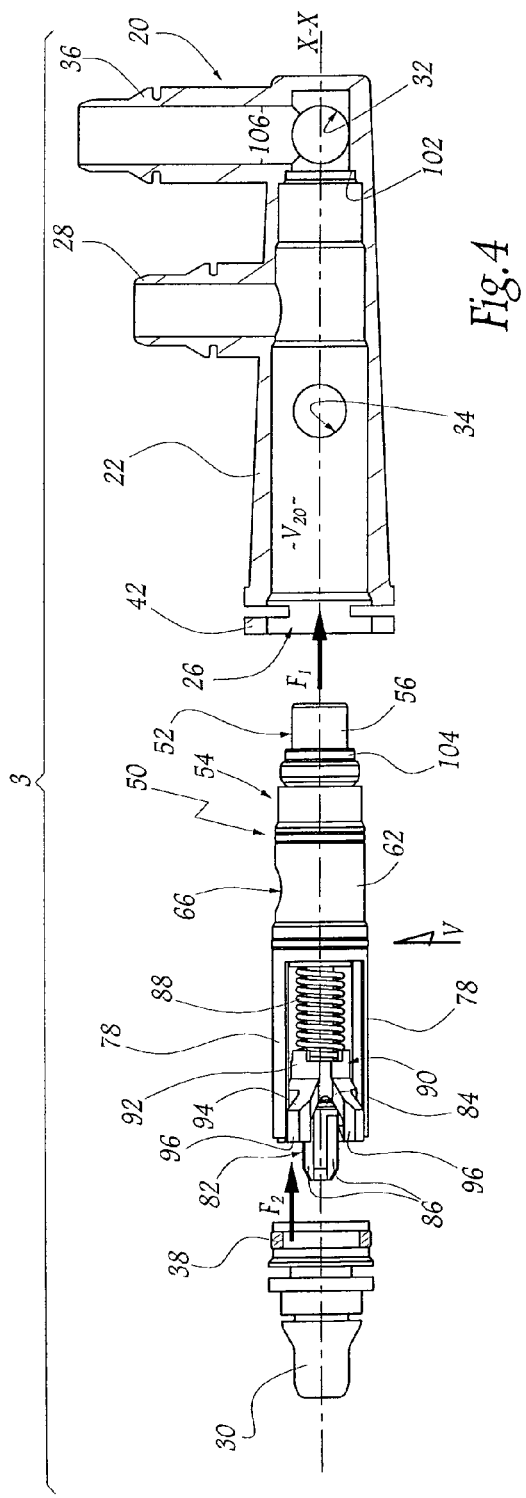
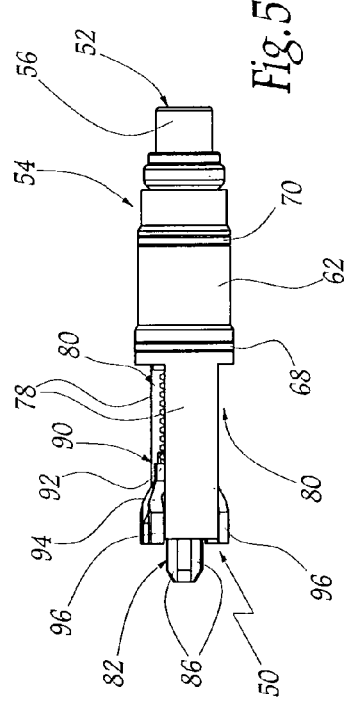
Fig. 4
Fig. 5

FLUID REGULATION THERMOSTATIC VALVE, COOLANT CIRCUIT INCLUDING SUCH VALVE AND METHOD FOR MAKING SUCH VALVE

The present invention relates to a thermostatic valve for regulating a fluid, in particular a cooling liquid, and to a circuit for circulating a cooling liquid, in particular a liquid for cooling an engine, the circuit being associated with a heat exchanger having passing therethrough both said cooling liquid and a temperature setpoint liquid, in particular oil from a gearbox associated with the engine. The invention also relates to a method of fabricating such a valve.

BACKGROUND OF THE INVENTION

Description of the Related Art

FR-A-2 807 818 discloses a valve and a circuit of this type, in which a thermostatic element incorporated in a valve casing controls the admission of hot cooling liquid and/or cold cooling liquid into a heat exchanger that is also fed by oil from a gearbox. Such regulation is advantageous, but in general, the valve making such regulation possible is complex to design and to assemble because of the need to control movement in translation of the piston of the thermostatic element for the purpose of determining the flow rates of the hot cooling liquid and of the cold cooling liquid that are admitted into the heat exchanger on the basis of a temperature setpoint associated with the gearbox oil in which the thermosensitive cup of the thermostatic element needs to be immersed, but without it being possible for said oil to become mixed with the cooling liquid. In particular, the piston is firmly secured to two shutters provided for regulating the respective flows of the hot and cold cooling liquid entering the valve. The corresponding arrangements require numerous individual parts that are complicated to assemble together, that include parts that are specific to the shape of the valve casing and that, in the event of any one of them malfunctioning, make it necessary to change the entire valve.

OBJECT OF THE INVENTION

The object of the present invention is to remedy those drawbacks by proposing a thermostatic valve that is easy to fabricate and to repair, and in which it is easy to modify the shape of the casing.

To this end, the invention provides a thermostatic valve for regulating a fluid, in particular a cooling liquid, as defined in claim 1.

Thus, according to the invention, a thermostatic element and the support body for said element, are made available assembled one to the other, in the form of a one-piece thermostatic assembly that can be fitted in a single operation in the valve casing. In other words, the thermostatic assembly is similar to a unitary cartridge in the sense that the assembly can be fabricated and delivered independently of the remainder of the valve, in particular the valve casing, and can then be assembled as original equipment or as a replacement part in one or more valve casing models presenting respective different shapes, e.g. shapes that are specific to particular engine environments. It will be understood that the valve assembly of the invention is found to be particularly practical, and that in the event of one of the components of the thermostatic assembly malfunctioning, the faulty assembly can be rapidly separated from the valve casing and replaced by a new thermostatic assembly, with this requiring a minimum number of maintenance operations.

The solution proposed by the invention also improves the reliability of the valve, since the pre-assembled thermostatic assembly is advantageously tested and inspected before being fitted in the final valve casing.

The advantages of the valve of the invention, associated with its ease of assembly, with the use of a single thermostatic assembly for a variety of valve casing shapes, with its ease of maintenance, and with its improved reliability, also give rise to a reduction in the cost of designing and fabricating the valve.

Advantageous characteristics of the valve, taken in isolation or in any technically feasible combination, are defined in claims 2 to 10.

The invention also provides a circuit for circulating a cooling liquid, as defined in claim 11.

The invention also provides a method of fabricating a thermostatic valve for regulating a fluid, as defined in claim 12.

The method of the invention makes it possible in particular to fabricate the thermostatic valve as defined above.

BRIEF DESCRIPTION OF THE OF THE DRAWINGS

The invention can be better understood on reading the following description given purely by way of example and made with reference to the drawings, in which:

FIG. 4 is an exploded view showing how the valve is assembled, the valve casing being shown in section in the same plane as in FIG. 3, while the other components of the valve are shown in elevation; and FIG. 5 is an elevation view of a pre-assembled component of the valve, seen looking along arrow V of FIG. 4.

DETAILED DESCRIPTION OF THE PREFERRED EMBODIMENTS OF THE INVENTION

Figure 1:
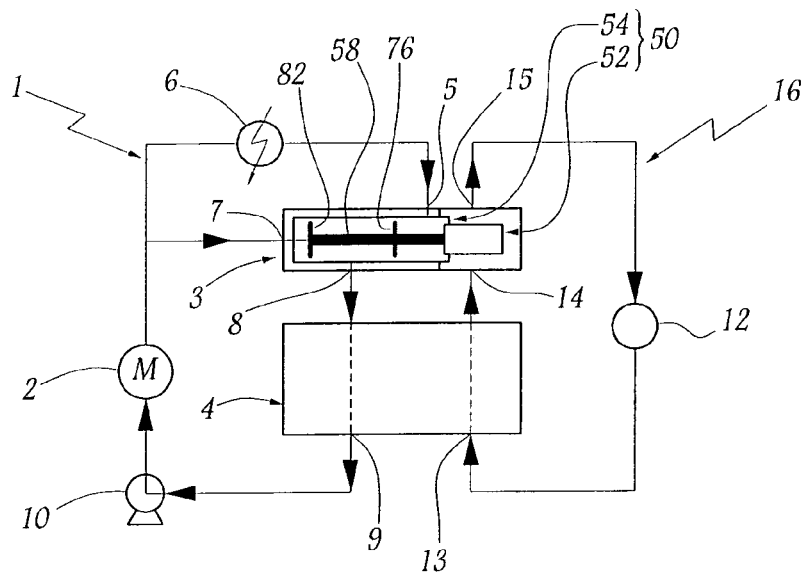
FIG. 1 is a diagram of a circuit for circulating a cooling fluid, the circuit being fitted with a thermostatic valve in accordance with the invention and a heat exchanger associated with the valve.

FIG. 1 shows a circuit 1 for circulating a cooling liquid for an engine 2, in particular an engine for a motor vehicle. The circuit 1 is fitted with a thermostatic valve 3 and with a heat exchanger 4 that are functionally associated with each other, as described in detail below.

Within the circuit 1, the cooling liquid feeds the valve 3 via two distinct inlets, namely a first inlet 5 that is fed with liquid coming from a radiator 6 that is suitable for exchanging heat with outside air to lower the temperature of the liquid passing therethrough and coming from the engine 2, and a second inlet 7 fed with liquid coming directly from the engine 2, without any heat exchanger being interposed. In operation, it should be understood that the temperature of the liquid admitted via the inlet 5 is lower than the temperature of the liquid admitted via the inlet 7, providing the flow rates through the inlets are not zero. The cooling liquid is designed to be discharged from the valve 3 via an outlet 8 feeding the heat exchanger 4, from which the liquid escapes via an outlet 9 connected to a pump 10 for driving the liquid around the circuit 1, and having its delivery sent to the engine 2.

Within the heat exchanger 4, the cooling liquid from the outlet 8 exchanges heat with the oil of a gearbox 12. The oil coming from the gearbox passes in succession through the heat exchanger via an inlet 13, and the valve 3 via an inlet 14. The oil is discharged from the valve via an outlet 15 connected to the gearbox 12. The gearbox oil thus circulates in its own circuit 16 that is distinct from the cooling liquid circuit 1, in the sense that these two fluids do not mix together.

Figure 2:
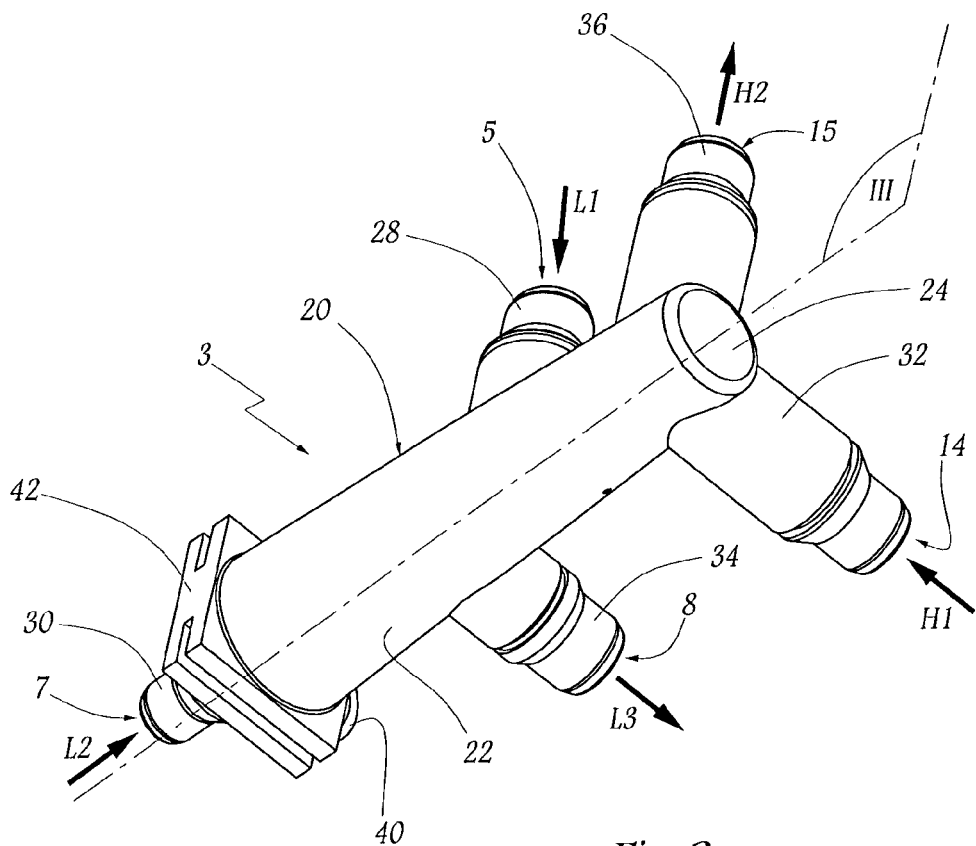
FIG. 2 is a perspective view of the valve fitted to the FIG. 1 circuit.
Figure 3:
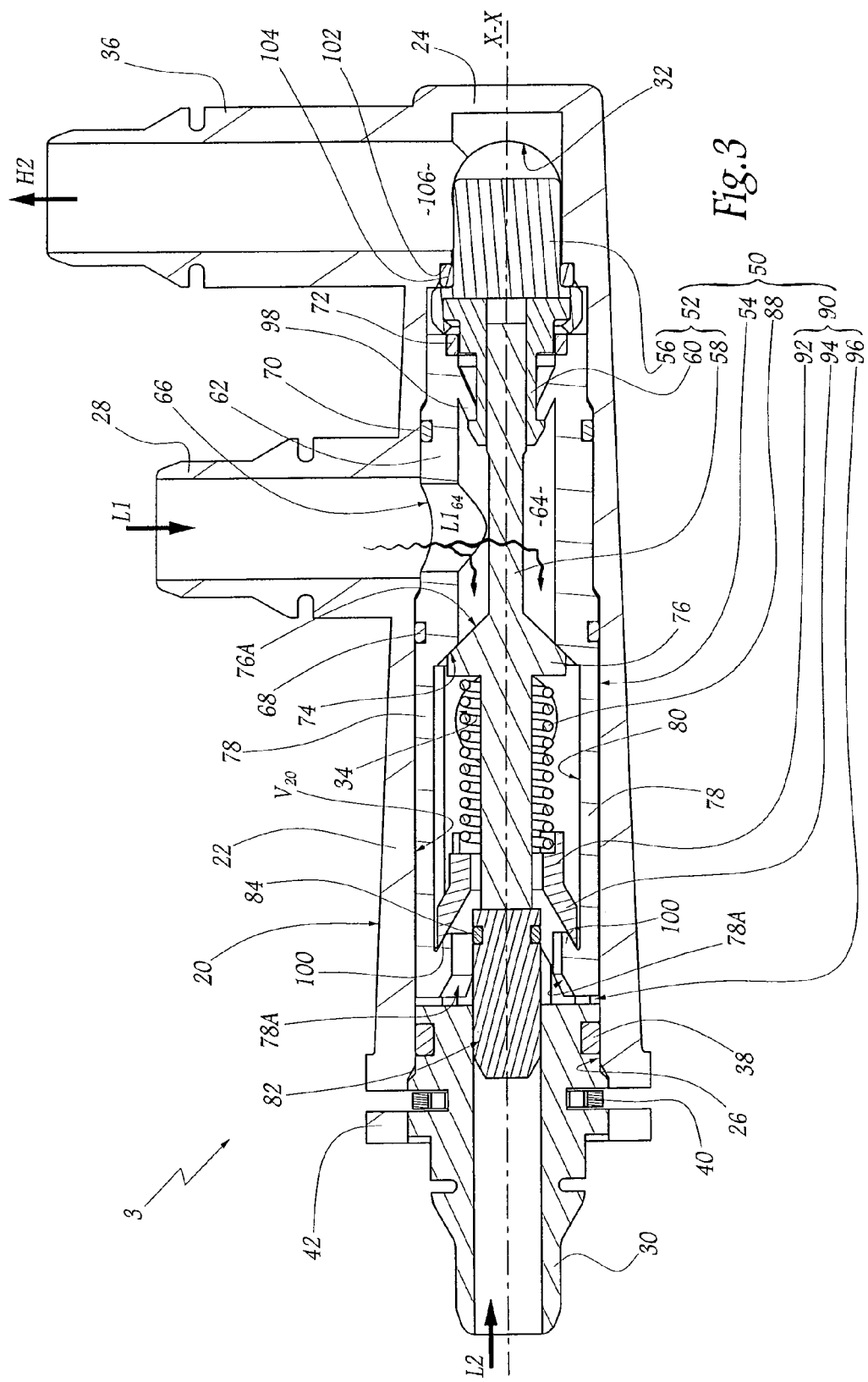
FIG. 3 is a longitudinal section of the FIG. 2 valve, on a plane III.

The thermostatic valve 3, shown in greater detail in FIGS. 2 to 4, comprises a rigid outer casing 20, made in particular out of plastics material. For this purpose, the casing 20 comprises a tubular main wall 22 having a central longitudinal axis X-X lying in the section plane of FIG. 3. This wall 22 defines an internal empty volume $V_{20}$ that is generally in the form of a stepped cylinder centered on the axis X-X. If the other components of the valve 3 are ignored, then, as can be seen clearly in FIG. 4, the volume $V_{20}$ is closed at its smaller-diameter axial end by an end wall 24 formed integrally with the main wall 22, and it is open to the outside at its opposite axial end, forming a cylindrical orifice 26 centered on the axis X-X and defined by the corresponding end of the main wall 22. The volume $V_{20}$ also opens out to the outside via the inlets 5, 7, and 14, and via the outlets 8 and 15. In practice, all of these inlets and outlets are implemented in the form of respective tubes 28, 30, 32, 34, and 36 that are suitable for connection to connection pipes forming parts of the circuits 1 and 16. The tubes 28, 32, 34, and 36 project outwards from the main wall 22 in respective directions that are radial relative to the axis X-X, being formed in particular integrally with said wall 22, whereas the tube 30 forms a part that is distinct from the casing 20 and that is fitted in the end orifice 26 so as to be centered on the axis X-X, with a sealing gasket 38 being interposed between them. The casing 20 is provided with a clip 40 for mechanically fastening the tube 30 in the orifice 26, the branches of the clip engaging in complementary outside grooves formed both in the wall of the tube 30 and in a flange 42 forming the end of the main wall 22 at the orifice 26.

On going axially along the volume $V_{20}$ from its end orifice 26, there are to be found the tube 30 of the inlet 7, the tube 34 of the outlet 8, the tube 28 of the inlet 5, and substantially at the same axial position, the tube 32 of the inlet 14 and the tube 36 of the outlet 15.

The valve 3 includes a thermostatic assembly 50, shown in FIG. 5 only, and designed to be placed inside the volume $V_{20}$ when the valve is in its assembled configuration. This assembly 50 essentially comprises a thermostatic element 52 and a body 54 for mechanically supporting the element 52.

The thermostatic element 52 includes a temperature-sensitive cup 56 that is filled with a thermally-expandable material such as a wax, a piston 58 that is movable relative to the cup 56, and an elongate sheath 60 fastened securely to the cup 56. The cup 56, the piston 58, and the sheath 60 all lie substantially on the same axis, being centered on the axis X-X when the assembly 50 is assembled to the casing 20. Under the effect of the thermally-expandable material contained in the cup 56 expanding, the piston 58 is suitable for moving in translation along its longitudinal axis relative to the cup 56, being guided in sliding by the sheath 60.

The support body 54 is of generally elongate and hollow shape. This body thus comprises a tubular wall 62 of central longitudinal axis substantially coinciding with the axis X-X when the assembly 50 is assembled to the casing 20. The wall 62 defines internally a chamber 64 that is substantially cylindrical, being open to the outside at both axial ends of the wall 62 and also communicating with the outside via a radial opening 66 passing through an intermediate portion of the wall 62.

The outside face of the tubular wall 62 is stepped in a manner that is complementary to the inside face of the tubular wall 22 of the casing 20, so that the body 54 is suitable for being received in complementary manner inside the internal volume $V_{20}$ of the casing 20, being positioned axially in the casing so that the tube 28 opens out radially into the opening 66, as shown in FIG. 3. The fluid coming from the tube 28 can thus feed the chamber 64 via the opening 66, it being observed that the contact between the tubular walls 22 and 62 is sealed by two O-rings 68 and 70, situated axially on either side of the opening 66.

At its longitudinal end having the smallest outside diameter, the tubular wall 62 receives internally the sheath 60 with a sealing gasket 72 interposed radially therebetween. The sheath 60 thus closes the corresponding end of the chamber 64 in leaktight manner.

At its opposite end, the tubular wall 62 defines internally a seat 74 against which a shutter 76 secured to the piston 58 can bear in leaktight manner. In the example shown in the figures, the shutter 78 is formed integrally with the intermediate portion of the piston and presents a frustoconical surface 76A centered on the longitudinal axis of the piston and converging towards the cup 56: this surface 76A is designed to bear in complementary and leaktight manner against the seat 74, depending on the position of the piston relative to the sheath 60. The shutter 76 thus opens and closes the corresponding end of the chamber 64.

At its end having the seat 74 on its inside, the tubular wall 62 is extended outwardly, away from the remainder of said wall, by two semi-tubular elongate branches 78 that are opposite each other in substantially symmetrical manner on either side of the longitudinal axis of the wall 62, i.e. the axis X-X when the thermostatic assembly 50 is assembled to the casing 20. Between them, in a peripheral direction relative to the above-mentioned axis, these branches 78 define two diametrically-opposite empty spaces 80, one forming a radial opening that opens out freely into the tube 34 when the valve 3 is in its assembled state. As a result, the fluid coming from the chamber 64, when the shutter 76 is open, can feed the tube 34 via the above-mentioned opening 80.

Advantageously, the piston 58 is extended axially beyond the shutter 76 away from the cup 56 and is fitted rigidly with another shutter 82 at its end remote from the cup. This shutter is in the form of a generally cylindrical body centered on the longitudinal axis of the piston, with its portion facing towards the cup being provided on the outside with an O-ring 84, while its opposite edge portion has axial grooves 86 formed therein, giving this portion a cross-section that is generally cross-shaped.

The shutter 82 is optional in the sense that the invention is applicable to a valve of the type having three orifices and two positions or two orifices and two positions.

The thermostatic element 56 is associated with a compression spring 88 for returning the piston 58 towards the cup 56 during contraction of the thermally-expandable material contained in the cup. For this purpose, a first axial end of the spring 88 presses against the shutter 76, while its opposite axial end bears against an abutment part 90 that is fitted to the free ends of the branches 78. At its axial end adjacent to the spring 88, the abutment part 90 has a ring 92 centered on the longitudinal axis of the piston 58 and slidably receiving said piston therein. At its end remote from the spring 88, the ring 92 is extended by a co-axial flare 94 of frustoconical shape diverging away from the ring. At each empty space 80 between the branches 78, the flare 94 is itself extended remote from the ring 92 by two legs 96 that are spaced apart from each other in a peripheral direction relative to the part 90. In cross-section, the four legs 96 are inscribed within a circle of diameter corresponding to the greatest outside diameter of the wall 62.

The thermostatic assembly 50 is obtained by assembling together the thermostatic element 52, the support body 54, the spring 88, and the abutment part 90. More precisely, while the piston 58 is still disconnected from the cup 56 and the sheath 60, the cup and the sheath are initially securely fastened to each other, in particular by crimping a collar of the cup around a corresponding portion of the sheath, and then they are inserted axially into the chamber 64 via the end of the wall 62 that has the smallest outside diameter. The sheath thus engages first within the wall 62 and moves along the chamber 64: the end of the sheath remote from the cup 56, presenting a frustoconical shape that diverges towards the cup, then flexibly deforms an annular tab 98 extending transversely, projecting towards the inside of the wall 62, this tab presenting a frustoconical shape substantially complementary to the end of the sheath. The sheath and the cup thus advance until the tab 98 clips around the sheath, by the free end of the tab returning elastically into an annular cavity that follows the frustoconical end of the sheath: the cup and the sheath are thus securely fastened to the body 54 by said clip-fastening tab 98, as shown in FIG. 3.

In practice, in variants that are not shown, a plurality of tabs of the same type as the tab 98 can be provided around the inside periphery of the wall 62; similarly, the or each tab may present a cross-section in a variety of shapes, in particular of a circular shape, so long as the shapes enable the stationary portion (cup 56 and sheath 60) of the thermostatic element 50 be clip-fastened.

The piston 58 is inserted axially into the chamber 64 from the axially opposite end of the body 54 and until its end opposite from the shutter 82 is inserted into the sheath 60, so that the sheath and the portion of the piston 58 extending from said sheath to the shutter 76 are thus located inside the chamber 64. As the piston advances axially into the chamber 64, the shutter 76 splays apart the free ends of the branches 78, with the frustoconical surface 76A of the shutter forming a ramp for splaying apart complementary frustoconical ramp surfaces 78A defined by the free ends of the branches 78. The branches 78 can be splayed apart because of their flexibility, with the zones where they join the wall 62 forming pseudo-hinges about axes extending generally circumferentially relative to the central axis of the wall 62.

The spring 88 and the part 90 are then fitted around the piston 58, being inserted axially between the branches 78 from the free ends thereof: in the same manner as the frustoconical surface 76A of the shutter 76, the frustoconical flare 94 splays the free ends of the branches apart by sliding against the complementary ramp surfaces 78A during insertion of the abutment part 90. The angular position of the part 90 is adjusted so that its legs 96 are positioned between the branches 78 around the periphery of the part 90. The part 90 continues to advance until the branches 78 return elastically to their initial position extending the tubular shape of the wall 62: releasing the part 90 enables the spring 88 to relax in part, thereby moving said part away from the shutter 76. Nevertheless, the part 90 does not escape from the branches 78 since the portions of the flare 94 situated at the periphery of said part along the branches become clipped within tabs 100 that project inwards from the free ends of the branches 78, as shown in FIG. 3.

The thermostatic assembly 50 is then in its assembled configuration as shown in FIGS. 4 and 5, independently of itself being assembled with the casing of the valve housing 20, as described below.

In order to fabricate the valve 3, the thermostatic assembly 50 is fitted in the inside volume $V_{20}$ of the casing 20 in a single operation like a unit cartridge: as represented by arrow $F_1$ in FIG. 4, the assembly 50 is inserted axially into the wall 22 from its end orifice 26 and going towards its end wall 24. The stepped inside surface of the wall 22 guides the advance of the body 54 towards the end wall 24, thus ensuring that the body is coaxial with the wall 22. The assembly 50 thus advances axially until the cup 56 comes axially into abutment against an inside shoulder of the wall 22, such as the shoulder referenced 102, axially situated level with the tubes 32 and 36, and with a sealing gasket 104 being interposed therebetween. The thermostatic assembly 50 is thus assembled in the casing 20 in the configuration shown in FIG. 3: the portion of the volume $V_{20}$ situated between the end wall 24 and the shoulder 102 is isolated in leaktight manner from the remainder of the volume $V_{20}$ and forms a channel 106 for oil flow between the inlet 14 and the outlet 15, radially interconnecting the tubes 32 and 36, the cup 38 being arranged across this channel 106.

Assembly of the valve 20 then consists in fitting the tube 30, by inserting it axially from the outside into the end orifice 26, as represented by arrow $F_2$ in FIG. 4, and then by securing it relative to the wall 22 by means of the clip 40. The free end of the shutter 82 is then received in complementary manner in the facing end of the tube 30. The valve then presents its final assembled configuration as shown in FIG. 3.

Advantageously, the tube 30 is so adapted that when it is fitted and secured to the orifice 26, it bears against the free ends of the legs 96 of the abutment part 90 so that the axial thrust on the part 90 due to the action of the spring 88 is taken up essentially or even exclusively by the casing 20 via the tube 30, whereas the thrust of said part against the tabs 100 of the branches 78 is then partially or even completely relaxed so as to avoid the branches breaking during subsequent thrust from the spring 88 while the valve 3 is in operation.

In operation, when the inlet 5 is fed with cooling liquid, as represented by arrow L1 in FIGS. 2 and 3, this liquid penetrates into the valve casing 20 via the tube 28 and reaches the body 54. Since the opening 66 is situated axially level with the outlet from the tube 28 into the volume $V_{20}$, this liquid is admitted radially into the chamber 64 via the opening 66 and then flows axially within the chamber towards the seat 74, as represented by arrow $L1_{64}$ in FIG. 3. If the shutter 76 is spaced apart axially from the seat 74 (configuration not shown), the fluid then flows axially between the branches 78 until it opens out into the volume $V_{20}$ of the tube 34 via one of the spaces 80.

Thus, the zone of the shutter 76 for shutting the flow of fluid is provided at the end of the wall 62 while said wall, because of its clip tab 98, is accurately positioned relative to the sheath 60 for guiding the piston 58, such that the corresponding shutting action is effective and reliable, even if the valve 3 is used in an environment that is difficult, e.g. being subjected to high operating temperatures and/or to mechanical vibration. The behavior of the valve in operation is thus remarkable.

Similarly, in operation, when the inlet 7 is fed with cooling liquid, as represented by arrow L2, this liquid penetrates into the casing 20 via the tube 30 and reaches the shutter 82. The liquid flows axially along the grooves 86, and providing the shutter 82 is far enough away from the tube 30 for the gasket 84 to be located outside said tube (the configuration shown), then the liquid goes around the gasket and flows into the internal volume $V_{20}$ as far as the place where the tube 34 opens out into said volume, the shutter 82 thus constituting a slide type shutter.

It can be understood that when the volume $V_{20}$ is fed simultaneously with liquid from the inlet 5 and with liquid from the inlet 7, these two liquids mix in the internal volume $V_{20}$ between the shutters 76 and 82, prior to being discharged from said volume via the outlet 8, as represented by arrow L3.

When the circuits 1 and 16 are in operation, oil is admitted into the channel 106 via the tube 32, as represented by arrow H1, and it is discharged therefrom via the tube 36, as represented by arrow H2. The oil flowing in this way along the channel 106 sweeps continuously over the cup 56, such that this oil constitutes a temperature setpoint liquid in the sense that it is the temperature of the oil that controls regulation of the cooling liquid by the valve 3. Thus, the distribution of the liquid flows L1, L2, and L3 is advantageously managed in proportional manner as a function of the temperature to which the thermostatic element 50 is subjected. For example, if it is considered that the valve is initially in its FIG. 3 configuration and that the temperature of the oil increases so as to exceed a predetermined threshold value, the piston 58 moves axially (to the left in FIG. 3) under the effect of the thermally-expandable material contained in the cup 56 expanding, the piston being guided by the sheath 60. The shutter 76 is subjected to a corresponding movement in translation and thus separates from the seat 74: the cooling liquid admitted into the inlet 5, i.e. the liquid coming from the engine 2 after passing through the cooling radiator 6, flows between this inlet 5 and the outlet 8, passing successively via the tube 28, the opening 66, the chamber 64, and the seat 74. This liquid then mixes with the liquid admitted into the volume $V_{20}$ by the shutter 82 via its grooves 86 and going past its gasket 84, i.e. mixing takes place with the liquid coming directly from the engine 2 and thus at a temperature higher than the temperature of the liquid coming from the radiator 6. These two cooling liquids mix in the volume $V_{20}$ prior to being discharged through the outlet 8 at an intermediate temperature. By heat exchange within the heat exchanger 4, the oil of the circuit 16 is cooled while the cooling liquid is heated, prior to being returned to the engine by the pump 10.

The cooling of the oil consequently causes the material contained in the cup 38 to contract so the piston 58 retracts into the cup under drive from the spring 88.

Thus, depending on the cooling requirements of the oil, the quantity of cold cooling liquid, i.e. liquid coming from the radiator 6, is regulated, it being observed that the inlet 7 may be shut off completely by the shutter 82 when the piston 58 is deployed far enough under the effect of the material contained in the cup 56 expanding greatly as a result of the high temperature of the oil flowing in the channel 106.

It is possible to envisage a variety of arrangements and variants for the thermostatic valve 3 and for the cooling liquid circuit 1. As examples:
the fastened connection between each shutter 76, 82 and the piston 58 may present a variety of forms, providing movements in translation of the piston are transmitted to the shutters;
the flow directions of the fluids in the accesses 5, 7, 8, 14, and 15 defined by the valve 3 can be reversed, in particular depending on whether or not the valve is associated with a heat exchanger such as the heat exchanger 4 and/or for the purpose of adapting to different circuit architectures; thus, the cooling liquid may be admitted into the valve via a single inlet access and may leave via the other two accesses; similarly, the invention can be applied to valves of the three-position and two-orifice type or of the two-position and two-orifice type, in which case the shutter 82 may be omitted and the tube 30 replaced by a plug for completely closing off the internal volume $V_{20}$;
the relative disposition of the tubes 28 to 36 is not limited to that shown in the figures; various configurations can be envisaged for the casing of the valve, in particular depending on the engine environment in which the valve of the invention is to be incorporated; and/or
one and/or the other of the liquids flowing in the circuits 1 and 16 may be a cooling liquid, water, oil, air, etc.

The invention claimed is:

1. A thermostatic valve for regulating a fluid, in particular a cooling liquid, the valve comprising:
a casing defining first and second fluid accesses that open out into an internal volume of the casing,
a thermostatic element comprising a piston carrying a shutter for controlling the flow of fluid in the casing between the first and second accesses and movable in translation along a translation axis relative to a stationary portion of the thermostatic element under the effect of the expansion of a thermally-expandable material contained in said stationary portion, the stationary portion of the thermostatic element in the assembled state of the valve being held stationary relative to the casing so that at least a portion of the piston provided with the shutter extends inside the internal volume, and
a hollow support body for supporting the thermostatic element, which support body defines internally a chamber and is adapted both to be securely fastened to the stationary portion so that at least a portion of the piston extends inside the chamber and the shutter controls the flow of fluid via the chamber, and to be received and held stationary in leak tight manner in the internal volume of the casing in such a manner that the fluid can flow between the first and second accesses via the chamber,
wherein a thermostatic assembly, made up of the support body and the thermostatic element assembled to each other, is suitable for being fitted as a single unit in the internal volume of the casing.

2. A valve according to claim 1, wherein, when the support body and the thermostatic element are assembled together, the chamber is closed in leak tight manner at one end along the translation axis of the piston by the stationary portion of the thermostatic element, and is associated at the opposite end with a leak tight bearing seat for the shutter.

3. A valve according to claim 2, wherein the support body defines said bearing seat internally.

4. A valve according to claim 2, wherein the chamber opens out freely to the outside of the support body via two openings extending transversely to the translation axis of the piston, these two openings being situated along said translation axis on either side of the bearing seat and being adapted respectively to be in free fluid-flow communication with the first and second fluid accesses when the thermostatic assembly is fitted in the internal volume of the casing.

5. A valve according to claim 1, wherein the support body is provided with clip means adapted to clip around the stationary portion of the thermostatic element when the support body and the thermostatic element are assembled together.

6. A valve according to claim 1, wherein the thermostatic assembly further comprises resilient return means for returning the piston relative to the stationary portion of the thermostatic element, the return means being interposed between the shutter and an abutment part that is fitted to the support body and that, prior to the thermostatic assembly being assembled in the casing, bears against a portion of the support body under the resilient action of the return means.

7. A valve according to claim 6, wherein said portion of the support body is provided with clip means suitable for clipping around the abutment part when the support body and said abutment part are assembled together.

8. A valve according to claim 6, wherein the valve further comprises closure means for partially or completely closing the internal volume of the casing, said closure means being adapted to be held stationary relative to the casing at its end opposite, along the translation direction of the piston, from the stationary portion of the thermostatic element in such a manner that, while the thermostatic assembly is being fitted into the internal volume of the casing, the abutment part comes to bear against said closure means, while releasing at least part of its thrust against said portion of the support body.

9. A valve according to claim 1, wherein the casing defines a third fluid access that opens out into the internal volume of the casing and that is adapted to be put into fluid flow communication with the chamber of the support body while the thermostatic assembly is fitted to the casing, said third fluid access being situated axially on the same side of the first and second fluid accesses, and the valve further comprises another shutter carried by the piston and adapted to control the flow of fluid via the chamber between the second and third fluid flow accesses when the thermostatic assembly is fitted in the internal volume of the casing.

10. A valve according to claim 1, wherein the casing defines a flow channel through the casing for a fluid other than the fluid regulated by the valve, and wherein, when the thermostatic assembly is fitted in the internal volume of the casing, the stationary portion of the thermostatic element is disposed at least in part in said flow channel and co-operates with sealing means to separate said flow channel from the chamber of the support body.

11. A circuit for circulating a cooling liquid, associated with a heat exchanger through which the cooling liquid passes, and through which there passes a temperature setpoint liquid, wherein the circuit includes a thermostatic valve in accordance with claim 1 and wherein:
the first fluid access is fed by the cooling liquid at a first temperature;
the third fluid access is fed by the cooling liquid at a second temperature higher than the first temperature;
the second fluid access feeds the heat exchanger with the cooling liquid at a temperature lying between the first and second temperatures; and
the casing defines a flow channel through the casing, this flow channel being fed with the temperature setpoint liquid via an outlet from the heat exchanger, and wherein, when the thermostatic assembly is fitted in the internal volume of the casing, the stationary portion of the thermostatic element is disposed at least in part in said flow channel and co-operates with sealing means to separate said flow channel from the chamber of the support body.

12. A method of fabricating a thermostatic valve for regulating a fluid, in particular a cooling liquid, wherein there are made available:
a casing defining two fluid access opening out into an internal volume of the casing,
a thermostatic element comprising a piston that carries a shutter and that is movable in translation along a translation axis relative to a stationary portion of the thermostatic element under the effect of the expansion of a thermally-expandable material contained in said stationary portion, and
a hollow support body for supporting the thermostatic element, the support body defining therein a chamber,
and wherein, initially, a thermostatic assembly is formed by securely fastening the support body to the stationary portion of the thermostatic element in such a manner that at least a portion of the piston extends inside the chamber and the shutter controls the flow of fluid via the chamber, and secondly, the casing and the thermostatic assembly are assembled together by fitting said thermostatic assembly as a single unit in the internal volume of the casing, the support body then being received and held stationary in leak tight manner in said internal volume so that the fluid can flow between the two accesses via the chamber.

* * * * *